(12) United States Patent
Kaltani

(10) Patent No.: US 6,618,098 B1
(45) Date of Patent: Sep. 9, 2003

(54) ANALOG VIDEO NETWORK SYSTEM

(76) Inventor: Ted Kaltani, 3174 Pearwood Place, Miss., Ontario (CA), L5B 4H1

(*) Notice: Subject to any disclaimer, the term of this patent is extended or adjusted under 35 U.S.C. 154(b) by 0 days.

(21) Appl. No.: 09/650,517

(22) Filed: Aug. 29, 2000

(51) Int. Cl.[7] .............................................. H04N 5/268
(52) U.S. Cl. ...................................... 348/705; 348/159
(58) Field of Search ................................ 348/159, 588, 348/705, 706, 722; H04N 5/268

(56) References Cited

U.S. PATENT DOCUMENTS

| | | | |
|---|---|---|---|
| 5,264,929 A | * | 11/1993 | Yamaguchi ................. 348/159 |
| 5,293,313 A | | 3/1994 | Cecil et al. |
| 5,546,478 A | * | 8/1996 | Yoo et al. .................... 382/282 |
| 5,751,346 A | * | 5/1998 | Dozier et al. ................ 348/153 |
| 5,786,850 A | * | 7/1998 | Pritchett et al. ............ 348/158 |
| 5,926,285 A | | 7/1999 | Takahashi |
| 6,020,935 A | * | 2/2000 | Ioka et al. ................... 348/722 |
| 6,049,353 A | * | 4/2000 | Gray ............................ 348/159 |
| 6,091,881 A | | 7/2000 | Kamikubota |
| 6,097,902 A | | 8/2000 | Blume |
| 6,246,432 B1 | * | 6/2001 | Takami et al. ................ 348/65 |

* cited by examiner

Primary Examiner—Michael H. Lee
Assistant Examiner—Brian Yenke
(74) Attorney, Agent, or Firm—Marks & Clerk

(57) ABSTRACT

An analog video network system for producing a recorded output of a video image comprises a video camera for producing an analog video signal corresponding to a video image; a video monitor for receiving the analog video signal and displaying a video image according to the analog video signal; and an analog video output device for receiving the analog video signal and producing an output according to the analog video signal, which output is a functional replica of the video image. A relay, in an inactive state, connects the video camera to the video monitor so as to cause the video monitor to display the video image, and, in an active state, connects the video camera to the video monitor through the analog video output device so as to cause the analog video output device to produce the output and the video monitor to display the video image. A controller is used for activating and deactivating the relay.

17 Claims, 6 Drawing Sheets

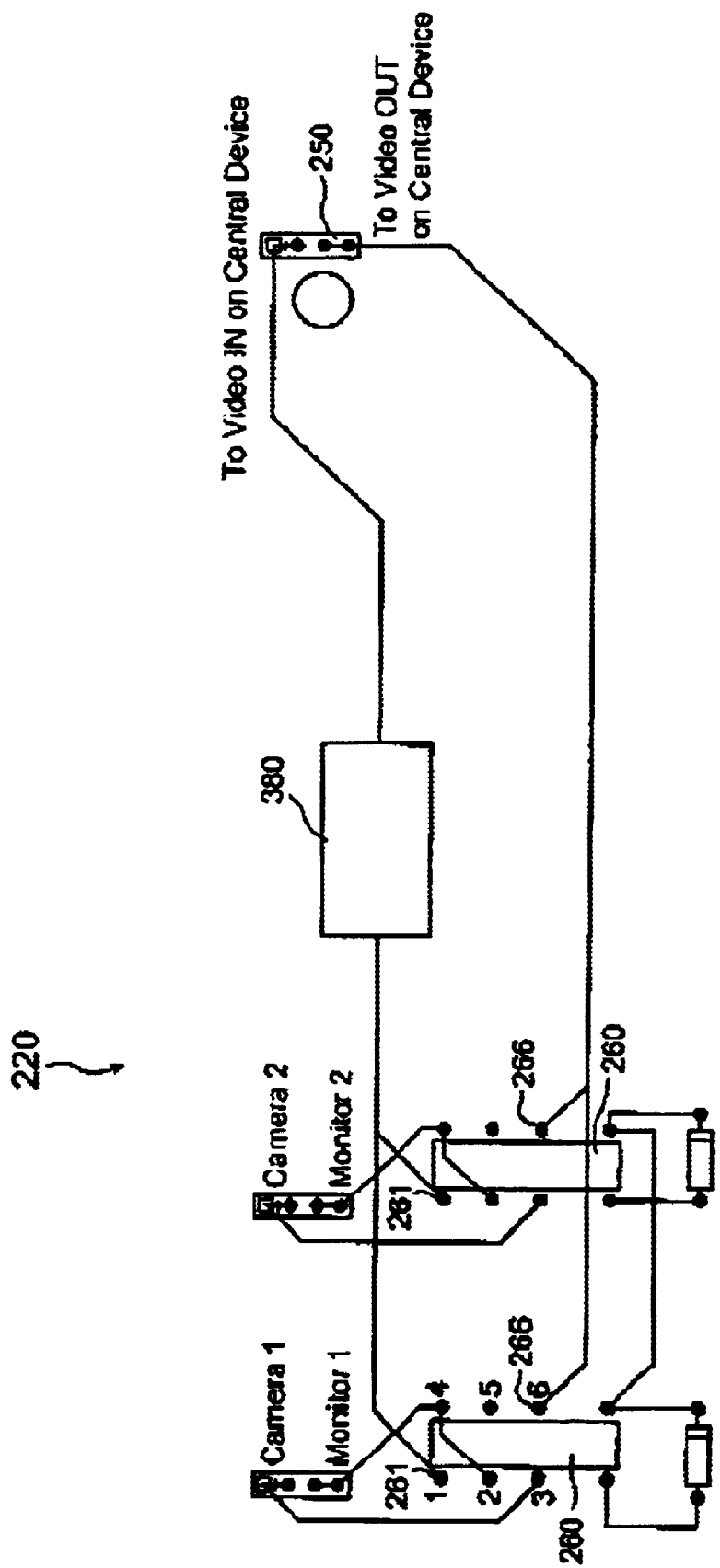

ANALOG VIDEO NETWORK SYSTEM

FIELD OF THE INVENTION

This invention relates to analog video network systems and more particularly to analog video network systems having a plurality of video cameras and employing analog video printers, and most particularly to such systems that are usable in the field of dentistry, especially for forensic applications.

BACKGROUND OF THE INVENTION

In the field of dentistry and in other medical sciences, it is often necessary to use a video camera to view an area of interest of a patient and display that area on a monitor. It is also often necessary to produce a printout of the video image by such a video system, in order to create a permanent record for a file.

In many instances, use of such video images in dentistry and other medical sciences, and especially the recording of such images by way of printing, is for forensic purposes. For reasons of legality, it is not permissible for video printouts used for forensic purposes to be altered in any manner. An exact unaltered replica of the image captured by the video camera must be produced by the video image printer.

As is well known in the art, it is quite possible to tamper with a digital image and thereby produce a resulting image without any evidence of tampering. However, in direct contrast, if an analog signal is tampered with, either the resulting image would be unrecognizable or it would be very apparent that tampering had occurred. Accordingly, an analog video printer must be used for forensic purposes in order to ensure that the resulting printed image is an accurate representation of what is being viewed by the video camera and also shown on the video monitor.

Modern dental operatories have a number of stations, with each station having a video camera, a video monitor, and an analog video printer. Such analog video printers are very expensive, thus very significantly increasing the cost of such dental operatories or possibly even limiting the number of these types of stations that dental operatories can afford to operate.

It is highly desirable for economic reasons to maximize the number of stations in a dental operatory that use a single analog video printer, or in an alternative sense, provide a means for permitting a single analog video printer to be used in a dental operatory.

U.S. Pat. No. 6,091,881 issued Jul. 18, 2000 to KAMIKUBOTA, discloses a Video Printer wherein two analog input sources comprising both video and audio are fed into an analog printer. A selectively operable switch permits selection of either of the two analog input sources for printing. A monitor is a connected to an analog output of the printer and another selectively operable switch permits viewing of either of the inputs, but only input one at a time. Accordingly, this system could not be used in the field of dentistry or other medical applications where more than one video input is used.

U.S. Pat. No. 6,097,902 issued Aug. 1, 2000 to BLUME, discloses an Enhanced Device for Producing Analog and Digital Images from Dental Radiographic Film and Process for Using the Same. The camera is connected to the input of a video amplifier. The output of the video amplifier is connected to an analog monitor and is also connected to a computer where it is converted from an analog signal to a digital signal. A digital monitor and conventional digital printer are connected to the computer. As discussed above, since the image is in digital format, it can be quite readily altered within the computer, without such alterations being discernible when the image is printed out.

U.S. Pat. No. 5,926,285 issued Jul. 20, 1999 to TAKAHASHI, discloses an Image Reproduction System for Reproducing a Still Image from Video, wherein a video camera is connected to an analog to digital converter. A switch permits selection between the signal originally from the video camera or from a digital signal from the data bus for routing to a printer.

U.S. Pat. No. 5,293,313 issued Mar. 8, 1994 to CECIL et al., discloses a Real Time Physician View Box for use up with a medical diagnostic imager. The system disclosed therein is significantly more complicated than the system has taught in Blume, and is representative of the very expensive types of image recording and printing systems used in medical sciences.

It is an object of the present invention to provide an analog video network system for producing a recorded output of a video image, preferably a printed output, which analog video network system permits a single analog video printer to be used by a number of stations each having a video camera and a video monitor.

SUMMARY OF THE INVENTION

In accordance with one aspect of the present invention, there is provided a novel analog video network system for producing a recorded output of a video image. The analog video network system comprises a video camera for producing an analog video signal corresponding to a video image; a video monitor for receiving the analog video signal and displaying a video image according to the analog video signal; and an analog video output device for receiving the analog video signal and producing a recorded output according to the analog video signal, which output is a functional replica of the video image. A relay, in an inactive state, connects the video camera to the video monitor so as to cause the video monitor to display the video image; and, in an active state, the relay connects the video camera to the video monitor through the analog video output device so as to cause the analog video output device to produce the recorded output and the video monitor to display the video image. A controller is used for activating and deactivating the relay.

In accordance with another aspect of the present invention, there is provided a novel analog video network system for producing a recorded output of a video image. The analog video network system comprises a first plurality of video cameras, each for producing an analog video signal corresponding to a video image; a first plurality of video monitors for receiving the analog video signal and displaying a video image according to the analog video signal, each video camera being connected to a respective video monitor; an analog video output device for receiving an analog video signal from a selected video camera and producing a recorded output according to the respective received analog video signal, which output is a functional replica of the video image, and a first plurality of relays. In an inactive state, each relay connects one of the video cameras to its respective one of the video monitors, so as to cause the video monitor to display the respective video image; and, in an active state, a selected relay connects a selected one of the video cameras to a corresponding one of the video monitors through the analog video output device so as to cause the analog video output device to produce the recorded output and the video monitor to display the respective video image. A controller is used for selectively activating a selected one of the relays, and for deactivating the remaining ones of the relays.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which:

FIG. 2A is a table representing the pin configurations of the relay depicted in FIG. 2;

FIG. 3A is a table representing the pin configurations of the relay depicted in FIG. 3;

DETAILED DESCRIPTION OF THE PREFERRED EMBODIMENTS

Figure 1:
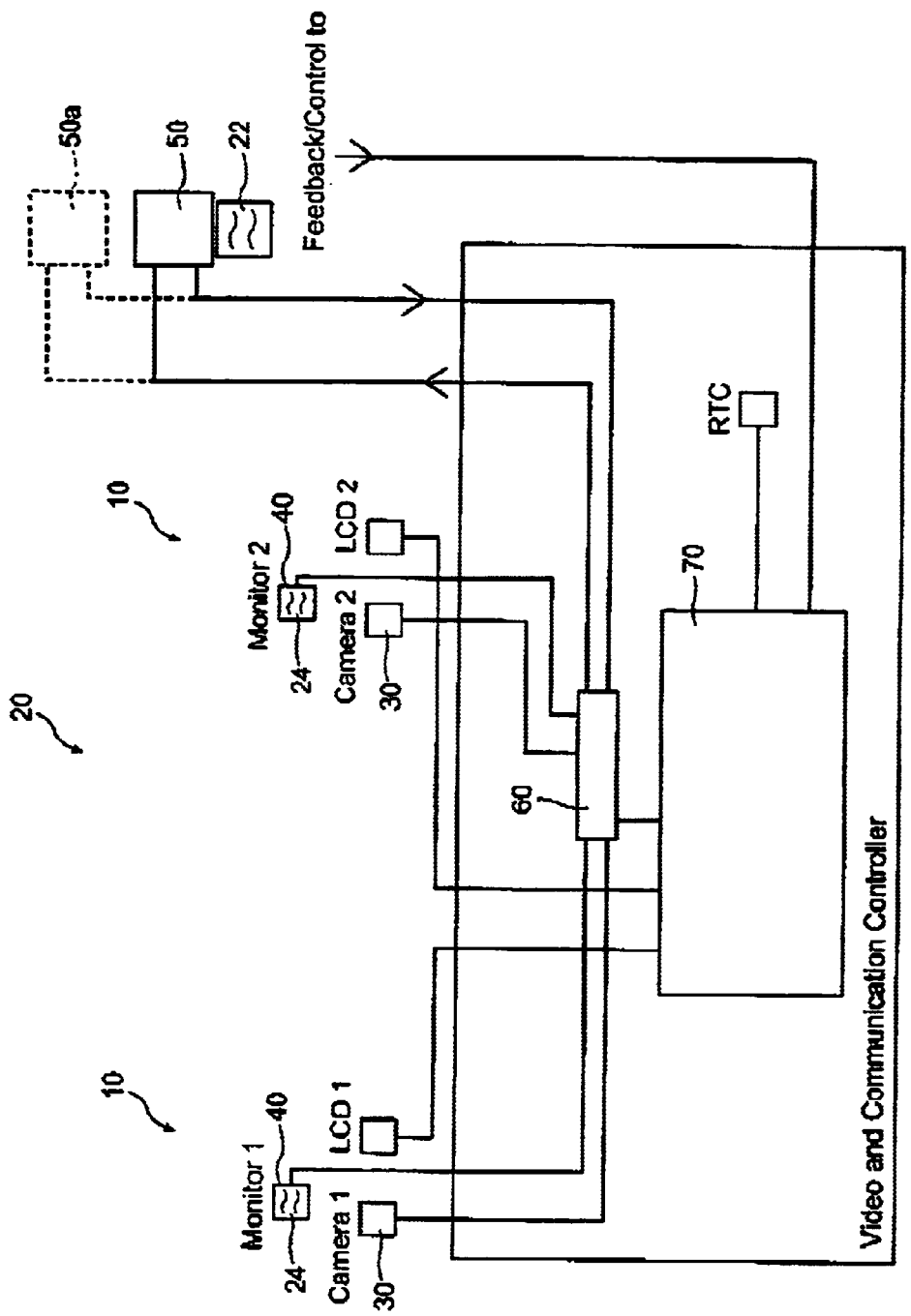
FIG. 1 is a simplified block diagrammatic representation of a preferred embodiment of the analog video network system according to the present invention.

Reference will now be made to FIGS. 1 through 4, which show a preferred embodiment of the analog video network system 20 of the present invention, for producing a recorded output 22 of a video image 24. The analog video network system 20 comprises a video camera 30 for producing an analog video signal corresponding to a video image 24. In the preferred embodiment as illustrated, the analog video network system 20 comprises a plurality of video cameras 30, one video camera 30 for each dental operatory station, as indicated by the general reference numeral 10. Preferably, the video camera 30 comprises a dental intra-oral camera that is used for close-up viewing of a patient's mouth. In any event, the video camera 30 produces an analog signal directly and exactly representative of the video image 24 which it generates.

The analog video network system 20 also comprises a video monitor 40 for receiving the analog video signal and displaying a video image 24 according to the analog video signal. In the preferred embodiment as illustrated, the analog video network system 20 comprises a plurality of video monitors 40, one video monitor 40 for each video camera 30. As can be seen in FIG. 1, each station 10 in the dental operatory has one video camera 30 and one video monitor 40.

There is also an analog video output device 50 for receiving the analog video signal and producing a recorded output 22 according to the analog video signal. The recorded output 22 is a functional replica of the video image 24 being displayed by the video monitor 40. In the preferred embodiment, as illustrated, the analog video output device 50 comprises a single analog video printer that is shared by the various stations 10, each station 10 having one video camera 30 and one video monitor 40. The analog video printer 50 produces a recorded output 22 that is a visual replica of the video image 24 being displayed by a respective analog video monitor 40.

Optionally or additionally, the analog video output device 50 could comprise an analog storage device 50a, such as an analog video cassette recorder, as is best seen in FIG. 1.

Still further, it may often occur that there is a requirement to provide an analog—that is, an unaltered and unalterable copy—of an X-Ray image. Such image may be such as that which is obtained using conventional X-Ray equipment, or even digital X-Ray equipment; but once the X-Ray image has been captured, there is a requirement to make an analog recorded image thereof. This is accomplished using conventional CCD or CMOS imaging technology so as to obtain an analog image of the X-Ray image.

The analog video network system 20 further comprises a plurality of relays 60, preferably a high speed telecommunications relays, that interconnect the video cameras 30, the video monitors 40 and the analog video printer 50. Each relay 60 comprises a six terminal double-pole double-throw relay having first 61, second 62, third 63, fourth 64, fifth 65, and sixth 66 terminals. The first terminal 61 is electrically connected to an inputs 52 of the analog video output device 50. The second 62 and fourth 64 terminals are electrically connected one to the other, typically by means of a jumper 67. The third terminal 63 is electrically connected to an output 32 of the video camera 30. The fourth terminal 64 is electrically connected to an input 42 of the video monitor 40. The sixth terminal 66 is electrically connected to an output 54 of the analog video output device 50.

Figure 2:
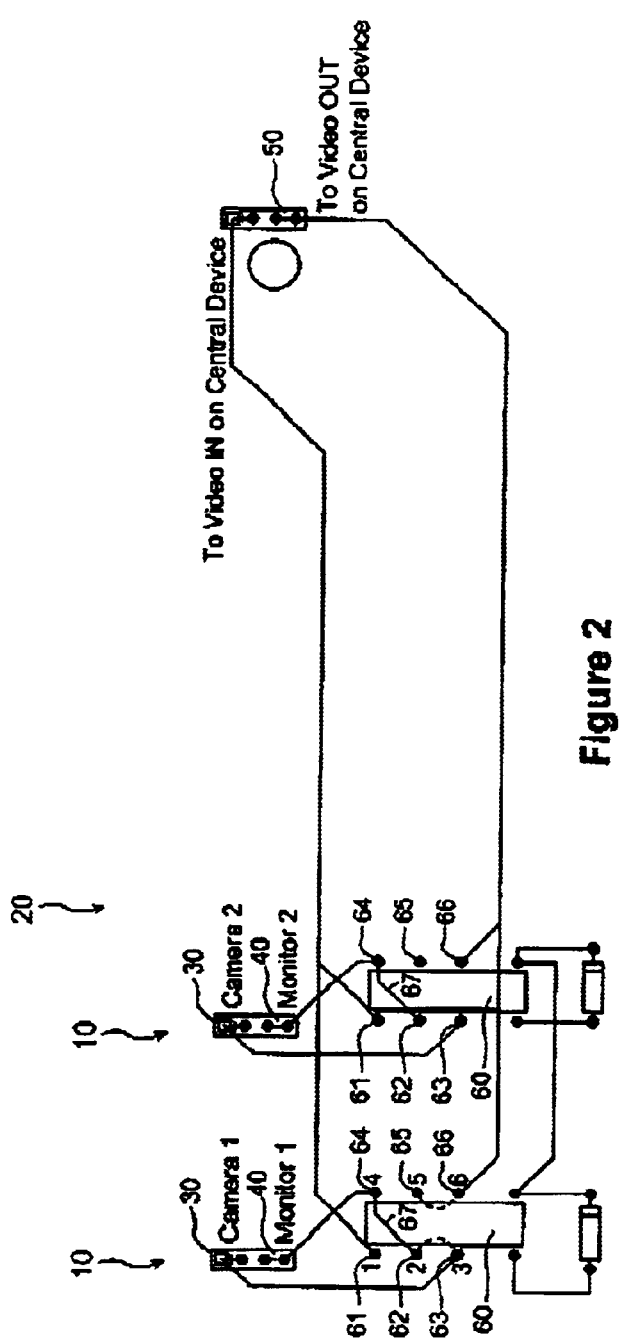
FIG. 2 is a simplified schematic of a portion of the analog video network system of FIG. 1, with the relay in an inactive state.
Figure 3:
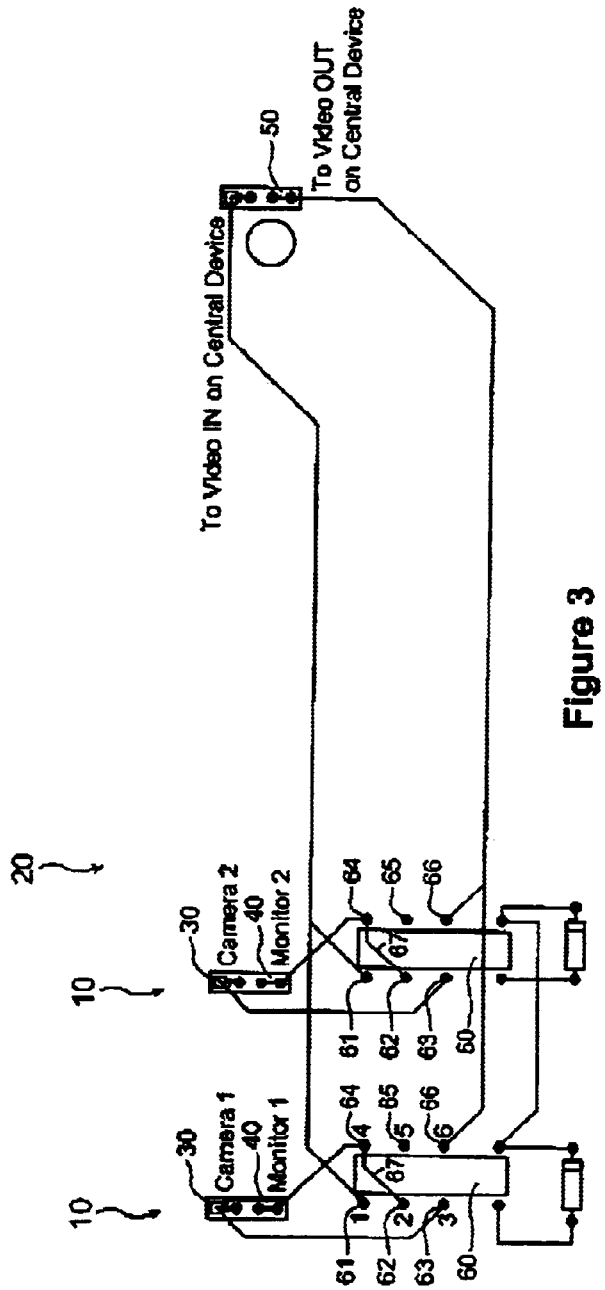
FIG. 3 is a simplified schematic similar to FIG. 2, but with the relay in an active state.

Each relay 60 has an inactive state, or in other words a "rest" state, as is depicted in FIGS. 2 and 2A, and also has an active state, as is depicted in FIGS. 3 and 3A. The active state is, in other words, a temporarily selected state that is different than the inactive state.

When in an inactive state, as depicted in FIGS. 2 and 2A, each relay 60 connects its respective video camera 30 to the respective video monitor 40 so as to cause the video monitor 40 to display the video image 24. More specifically, within the relay 60 itself, the second 62 and third 63 terminals are electrically connected one to the other, and the fifth 65 and sixth 66 terminals are electrically connected one to the other, thus connecting the video camera 30 to the video monitor 40.

When a relay 60 is in the active state, as depicted in FIGS. 3 and 3A, the relay 60 connects the video camera 30 to the video monitor 40 through the analog video output device 50 so as to cause the analog video output device 50 to produce the output 22 and the video monitor 40 to display the video image 24. More specifically, within the relay 60 itself, the first 61 and third 63 terminals are electrically connected one to the other, and the fourth 64 and sixth 66 terminals are electrically connected one to the other, thus connecting the video camera 30 to the video monitor 40 through the analog video output device 50, namely the printer.

In the preferred embodiment, as illustrated, the analog video printer 50 is connected to the relay 60 without intervening circuitry. In this manner, the output 22 from the printer is an exact replica of the video image 24 being displayed by the camera.

A controller 70 is provided for activating and deactivating the relay 60. In the preferred embodiment, as illustrated, the controller 70 comprises a manually operable switch means, and most preferably a momentary contact pushbutton type switch.

Figure 5:
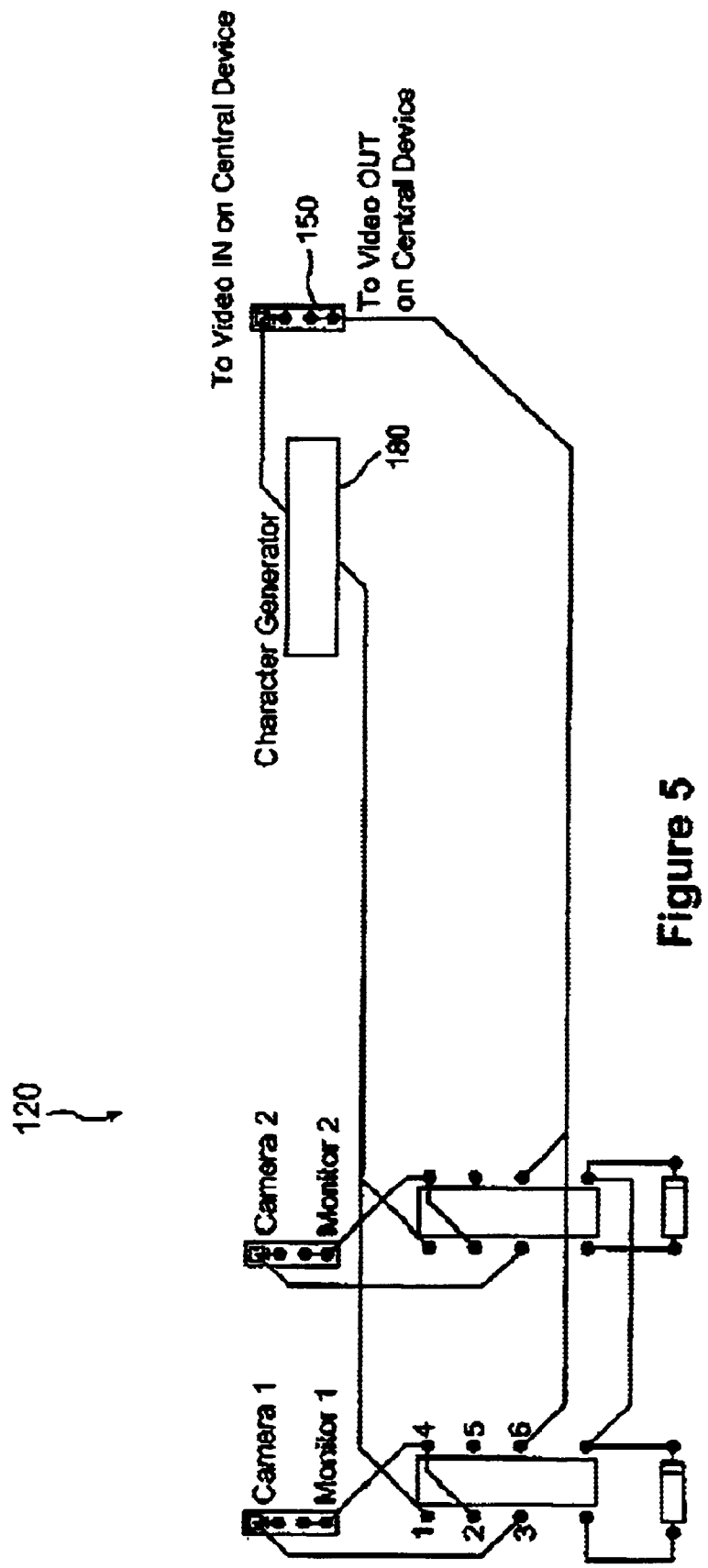

In a first alternative embodiment, as illustrated in FIG. 5, the analog video network system 120 further comprises character generator circuitry 180 electrically connected to the analog video output device 150, namely the analog video printer, for appending a character display to the recorded output 122 from the analog video printer 150. The character generator circuitry 180 includes a key entry device that includes a plurality of manually operable (usually pressable) keys 182, or virtual keys such as those found on touchpad technology types of key entry devices. The key entry device 180 may be either a keypad, such as a two-key keypad, a three-key keypad, a ten-key keypad, a twelve-key keypads (such as a conventional telephone type keypad), or any other suitable arrangement or type of keypad, or may also be a qwerty keyboard, or any other similar type of keyboard. The key entry device 180 may also include combinations of keypads and keyboards; and may, in fact, be a personal computer.

Figure 4:
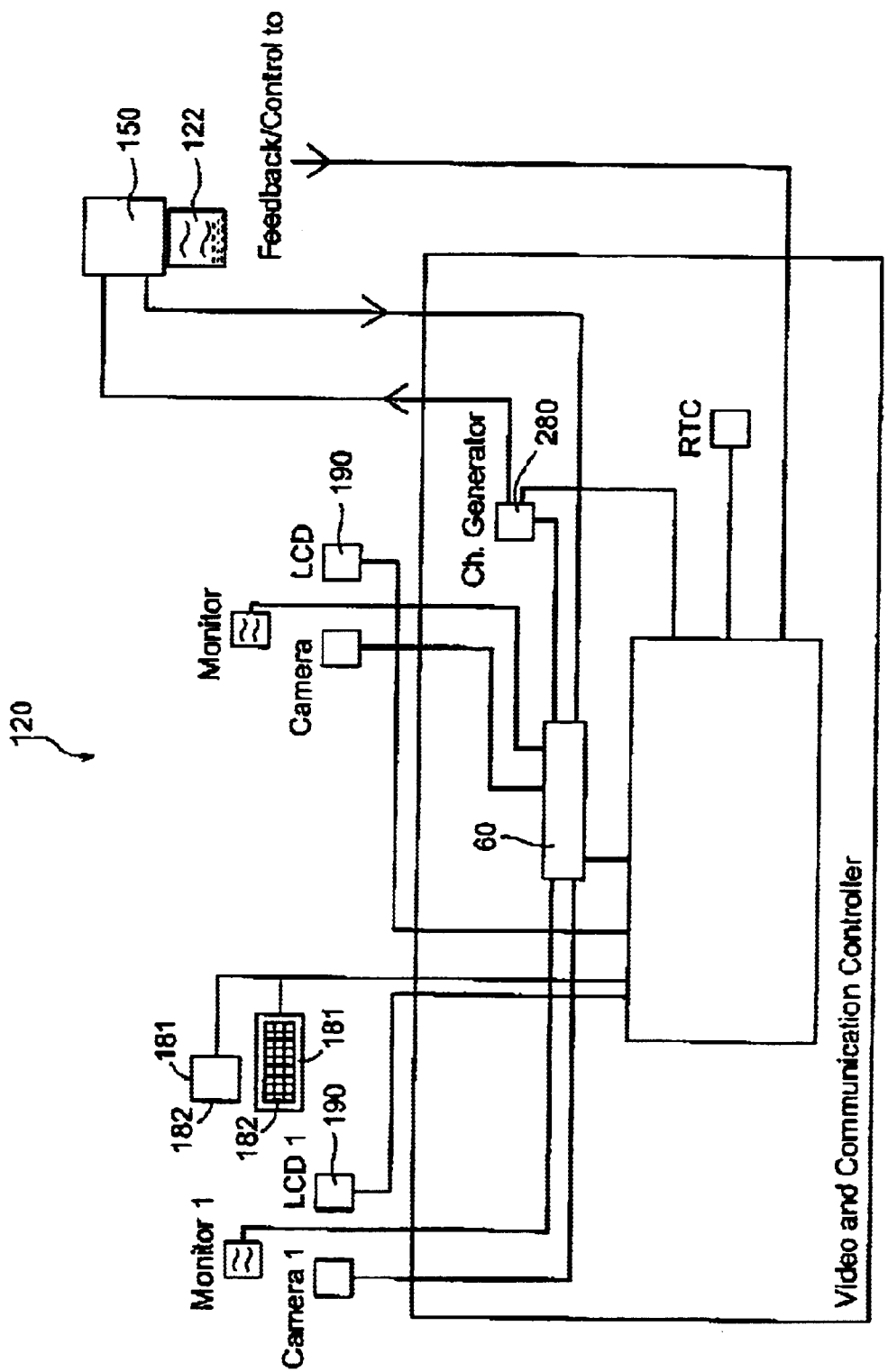
FIG. 4 is a simplified block representation of a first embodiment of the analog video network system according to the present invention; and, FIG. 5 is a simplified schematic representation of the LCD display panel used in the first alternative embodiment analog video network system of FIG. 4; and, FIG. 6 is a simplified schematic of a portion of a second alternative embodiment of the analog video network system according to the present invention.

A character generator 280 is shown in FIG. 4. The purpose of that character generator is to impose date stamp data, including particularly the date on which a video image is produced, and optionally the time of day when the image is produced. However, the character generator 280 is, in this case, a video character generator which operates using video overlay techniques as are well known. By such techniques, date stamp data or other data such as the name of the patient, the name of the doctor, and so on, can be overlaid using video overlay techniques onto the video image. In such instances, the video image which is sent to the analog video output device 50 is sent as an analog video signal. Accordingly, by use of an analog character generator, certain data may be superimposed upon or overlaid on the video image, using analog video techniques. The image itself, however, is not altered in any way, nor can it be.

A digital display screen 190, such as a liquid crystal display (LCD), is operatively connected to the character generator circuitry 180 or 280 to provide prompts and feedback for use with the key entry device. Such prompts might include "ENTER NAME OF PATIENT", "ENTER IMAGE NUMBER", and so on for keypads or keyboards having alphanumeric capability. For keypads with only numeric capability, the digital display screen could display a numbered list of choices. For smaller keypads, such as two-key keypads, the digital display screen could display a list of choices and the two keys could be used to navigate through the list.

In a second alternative embodiment of the analog video network system 220, as illustrated in FIG. 6, analog video output device 250, namely the analog video printer, is connected to the first 261 and sixth 266 terminals of the relay 260 with intervening circuitry 380. The intervening circuitry 380 might include linear amplification circuitry for amplifying the signal, analog multiplexing circuitry, filter circuitry, and combinations thereof. If the analog video network system 220 is to be used for forensic purposes, the intervening circuitry 380 must operate in such a manner that no circuit-produced artifact is introduced into the analog video signal. Otherwise, the intervening circuitry 380 can, in fact, be video injection equipment similar to the video character generator 280 discussed above.

Other variations of the above principles will be apparent to those who are knowledgeable in the field of the invention, and such variations are considered to be within the scope of the present invention. Further, other modifications and alterations may be used in the design and manufacture of the apparatus of the present invention without departing from the spirit and scope of the accompanying claims.

Moreover, use of the terms "he", "him", or "his", is not intended to be specifically directed to persons of the masculine gender, and could easily be read as "she", "her", or "hers", respectively.

What is claimed is:

1. An analog video network system for producing a recorded output of a video image, said analog video network system comprising:

a video camera for producing an analog video signal corresponding to a video image;

a video monitor for receiving said analog video signal and displaying a video image according to said analog video signal;

an analog video output device for receiving said analog video signal and producing a recorded output according to said analog video signal, which output is a functional replica of said video image;

a relay which, in an inactive state, connects said video camera to said video monitor so as to cause said video monitor to display said video image; and, in an active state, said relay connects said video camera to said video monitor through said analog video output device so as to cause said analog video output device to produce said recorded output and said video monitor to display said video image; and, a controller for activating and deactivating said relay.

wherein said relay comprises a six terminal double-pole double-throw relay having first, second, third, wherein said first terminal is electrically connected to an input of said analog video output device, said second and fourth terminals are electrically connected one to the other by means of a jumper, said third terminal is electrically connected to an output of said video camera said fourth terminal is electrically connected to an input of said video monitor, and said sixth terminal is electrically connected to an output of said analog video output device;

whereby, when said relay is in said inactive state, said second and third terminals are electrically connected one to the other, and said fifth and sixth terminals are electrically connected one to the other, thus connecting said video camera to said video monitor; and whereby, when said relay is in said active state, said first and third terminals are electrically connected one to the other, and said fourth and sixth terminals are electrically connected one to the other, thus connecting said video camera to said video monitor through said analog video output device.

2. The analog video network system of claim 1, wherein said relay comprises a high speed telecommunications relay.

3. The analog video network system of claim 1, wherein said analog video output device comprises an analog video printer.

4. The analog video network system of claim 1, wherein said analog video output device comprises an analog storage device.

5. The analog video network system of claim 1, wherein said analog video output device is connected to said first and sixth terminals of said relay without intervening circuitry.

6. The analog video network system of claim 1, wherein said analog video output device is connected to said first and sixth terminals of said relay with intervening circuitry, in such a manner that no circuit-produced artifact is introduced into said analog video signal.

7. The analog video network system of claim 6, wherein said intervening circuitry is chosen form the group of linear amplification circuitry, analog multiplexing circuitry, filter circuitry, and combinations thereof.

8. The analog video network system of claim 1, wherein said controller comprises a manually operable switch means.

9. The analog video network system of claim 8, wherein said manually operable switch means comprises a momentary contact pushbutton type switch.

10. The analog video network system of claim 1, wherein said video camera comprises a dental intra-oral camera.

11. The analog video network system of claim 1, wherein said analog video network system comprises a plurality of video cameras and a plurality of video monitors.

12. The analog video network system of claim 1, further comprising character generator circuitry electrically connected to said analog video output device, for appending a character display to said analog video signal so as to be in said output from said analog video output device.

13. The analog video network system of claim 12, wherein said character generator circuitry includes a key entry device chosen from the group consisting of two-key keypads, three-key keypads, ten-key keypads, twelve-key keypads, qwerty keyboards, and combinations thereof.

14. The analog video network system of claim 13, further comprising a digital display screen operatively connected to said character generator circuitry to provide prompts and feedback for use with said key entry device.

15. The analog video network system of claim 14, wherein said display screen comprises a liquid crystal display.

16. The analog video network system of claim 15, further comprising a digital display screen operatively connected to said character generator circuitry to provide prompts and feedback for use with said key entry device.

17. An analog video network system for producing a recorded output of a video image, said analog video network system comprising:

a first plurality of video cameras, each for producing an analog video signal corresponding to a video image;

a first plurality of video monitors for receiving said analog video signal and displaying a video image according to said analog video signal, each video camera being connected to a respective video monitor;

an analog video output device for receiving an analog video signal from a selected video camera and producing a recorded output according to said received analog video signal, which output is a functional replica of said video image;

a first plurality of relays, wherein, in an inactive state, each relay connects one of said video cameras to its respective one of said video monitors, so as to cause each video monitor to display the respective video image; and, in an active state, a selected relay connects a selected one of said video cameras to a corresponding one of said video monitors through said analog video output device so as to cause said video output device to produce said recorded output and said respective video monitor to display said respective video image; and, a controller for selectively activating a selected one of said relays and for deactivating the remaining ones of said relays;

wherein each said relay comprises a six terminal double-pole double-throw relay having first, second, third, fourth, fifth and sixth terminals;

wherein said first terminal of each respective relay is electrically connected to an input of said analog video output device, said second and fourth terminals of each respective relay are electrically connected one to the other by means of a jumper, said third terminal of each respective relay is electrically connected to an output of the respective video camera, said fourth terminal of each respective relay is electrically connected to an input of the respective video monitor, and said sixth terminal of each respective relay is electrically connected to an output of said analog video output device;

whereby, when each respective relay is in said inactive state, said second and third terminals of each respective relay are electrically connected one to the other, and said fifth and sixth terminals of each respective relay are electrically connected one to the other, thus connecting the respective video camera to the respective video monitor; and whereby, when each respective relay is in said active state, said first and third terminals of each respective relay are electrically connected one to the other, and said fourth and sixth terminals of each respective relay are electrically connected one to the other, thus connecting the respective video camera to its respective video monitor through said analog video output device.

* * * * *